(12) United States Patent
Zhou

(10) Patent No.: US 11,687,572 B2
(45) Date of Patent: Jun. 27, 2023

(54) COMPUTER SECURITY USING CONTEXT TRIGGERED PIECEWISE HASHING

(71) Applicant: Microsoft Technology Licensing, LLC, Redmond, WA (US)

(72) Inventor: Gang Zhou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/888,961

(22) Filed: Aug. 16, 2022

(65) Prior Publication Data

US 2022/0406052 A1 Dec. 22, 2022

Related U.S. Application Data

(63) Continuation of application No. 16/854,820, filed on Apr. 21, 2020, now Pat. No. 11,449,608.
(Continued)

(51) Int. Cl.
*G06F 16/13* (2019.01)
*G06F 16/903* (2019.01)
(Continued)

(52) U.S. Cl.
CPC ......... *G06F 16/30* (2019.01); *G05B 19/4155* (2013.01); *G06F 16/137* (2019.01); *G06F 16/182* (2019.01); *G06F 16/90344* (2019.01); *G06F 18/22* (2023.01); *G06F 21/565* (2013.01); *G06T 7/66* (2017.01); *G06T 7/73* (2017.01); *G06V 10/764* (2022.01); *G06V 10/96* (2022.01); *G06V 20/64* (2022.01); *G05B 2219/39167* (2013.01); *G06T 2207/10028* (2013.01)

(58) Field of Classification Search
CPC ........ G06T 7/73; G06V 10/764; G06V 10/10; G06V 10/20; G06V 20/64; G06V 20/647; G06V 20/653; G06F 18/00; G06F 18/24; G06F 18/241; G06F 18/2411; G06F 18/2413; G06F 18/24133; G06F 18/24137; G06F 18/2414; G06F 18/24143; G06F 18/24147; G06F 18/2415; G06F 18/24155; G06F 18/243; G06F 18/2431; G06F 18/24317; G06F 18/24323; G06F 18/2433; G06F 18/245; G06F 18/2451; G06F 18/2453; G06F 21/565; G06F 16/182; G06F 16/137; G06F 6/90344; G06K 9/6201
See application file for complete search history.

(56) References Cited

U.S. PATENT DOCUMENTS 10,621,346 B1\* 4/2020 Singh .................... H04L 63/145
2020/0073959 A1\* 3/2020 Tian ....................... G06N 7/023

\* cited by examiner

*Primary Examiner* — Kris E Mackes
(74) *Attorney, Agent, or Firm* — Schwegman Lundberg & Woessner, P.A.

(57) ABSTRACT

Generally discussed herein are devices, systems, and methods for clustering based on context triggered piecewise hashing (CTPH). A method can include determining a first index of a first CTPH string of the file. The first index can include contiguous bits of the CTPH string. The first index can be smaller than the CTPH string, such as to be a proper subset of the CTPH string. The method can include determining the first index matches a second index of a cluster of files and in response to determining the first index matches the second index of the cluster, associating the file with the cluster. The method can include determining that the file includes malware based on the cluster.

18 Claims, 9 Drawing Sheets

Related U.S. Application Data

(60) Provisional application No. 62/914,793, filed on Oct. 14, 2019.

(51) Int. Cl.
| | |
|---|---|
| *G06F 16/30* | (2019.01) |
| *G06F 21/56* | (2013.01) |
| *G06F 16/182* | (2019.01) |
| *G06T 7/66* | (2017.01) |
| *G06T 7/73* | (2017.01) |
| *G06V 10/96* | (2022.01) |
| *G06V 20/64* | (2022.01) |
| *G06V 10/764* | (2022.01) |
| *G05B 19/4155* | (2006.01) |
| *G06F 18/22* | (2023.01) |

COMPUTER SECURITY USING CONTEXT TRIGGERED PIECEWISE HASHING

RELATED APPLICATION

This application is a continuation of U.S. application Ser. No. 16/854,820, filed Apr. 21, 2020, and claims the benefit of priority to U.S. Provisional Patent Application Ser. No. 62/914,793, filed on Oct. 14, 2019, and titled "Computer Security Using Context Triggered Piecewise Hashing," which applications are incorporated herein by reference in their entirety.

BACKGROUND

Similarity analysis in computer security has been used for many years. Context triggered piecewise hashing (CTPH) is an example of a similarity analysis technique. Others have used a Levenshtein distance based on CTPH hashes of data to determine whether the data is similar. However, this analysis is prohibitively expensive in terms of computation resources and computation time. Further, the determination of a clustering percentage (a threshold distance that determines whether to cluster CTPH strings) is arbitrary and provides unpredictable results. More efficient similarity analysis techniques, and more deterministic techniques are desired.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Systems, methods, device, and computer or other machine-readable media can provide improvements over prior CTPH string comparison techniques or malware detection techniques. The improvements can include faster processing time and reduced memory overhead to decide whether the CTPH string matches another CTPH string. The improvements can be, at least partially, from removing a Levenshtein distance calculation from the CTPH string comparison. Instead of determining a distance between the CTPH strings, embodiments can compare indices of the CTPH strings and associate the CTPH strings if the indices match. Another advantage of embodiments can include determinism. The prior distance calculations require a user to define a distance below which to associate the CTPH strings. This requirement makes the distance calculation dependent on the defined distance and non-deterministic. More advantages and further details regarding these advantages are discussed elsewhere herein.

A system can include processing circuitry and a memory. The memory can include instructions that, when executed by the processing circuitry, cause the processing circuitry to perform operations for determining a file includes malware. The operations can include determining a first index of a first context triggered piecewise hashing (CTPH) string of the file, the first index including contiguous bits of the CTPH string. The first index can be a proper subset of the CTPH string. The CTPH string and the proper subset cannot include the null set. The operations can include determining the first index matches a second index of a cluster of files. The operations can include, in response to determining the first index matches the second index of the cluster, associating the file with the cluster. The operations can include determining that the file includes malware based on the cluster. The operations can include marking the file as possible malware, preventing a user from opening the file, deleting the file, providing a report indicating the file, the associated cluster, or the like, to personnel that handle malware, or the like.

Determining the first index of the first CTPH string can include splitting the first CTPH string into disjoint portions of contiguous, non-overlapping bits. The first index can be determined as a first number of contiguous (e.g., non-overlapping) bits of a portion of the portions of the first CTPH string. The cluster can include one cluster of respective clusters of files.

The first index can include the most significant bytes of the CTPH string. The operations can further include determining a third index of the CTPH string that corresponds to least significant bytes of the CTPH string matches the second index. The operations can further include, in response to determining the third index of the CTPH string matches the second index, associating the file with the cluster of the clusters.

The third index can (only) be determined in response to the first index not matching any of the respective second indexes.

The operations can further include determining, for each portion of the portions, a fourth index that includes the second most significant bytes of the portion, determining, for each portion of the portions, a fifth index that includes the third most significant bytes of the portion. The operations can further include, in response to determining one of the first index, fourth index, and fifth index of a portion of the portions matches the second index, associating the file with the cluster.

The third index includes the least significant bytes of the portion and is determined for each portion of the portions. The operations can further include determining, for each portion of the portions, a sixth index that includes the second least significant bytes of the portion. The operations can further include, in response to determining one of the third index or sixth index matches the second index, associating the file with the cluster.

A method can include performing the operations of the system. A machine-readable medium can include instructions that, when executed by a machine, cause a machine to perform the operations of the system.

DETAILED DESCRIPTION

Figure 1:
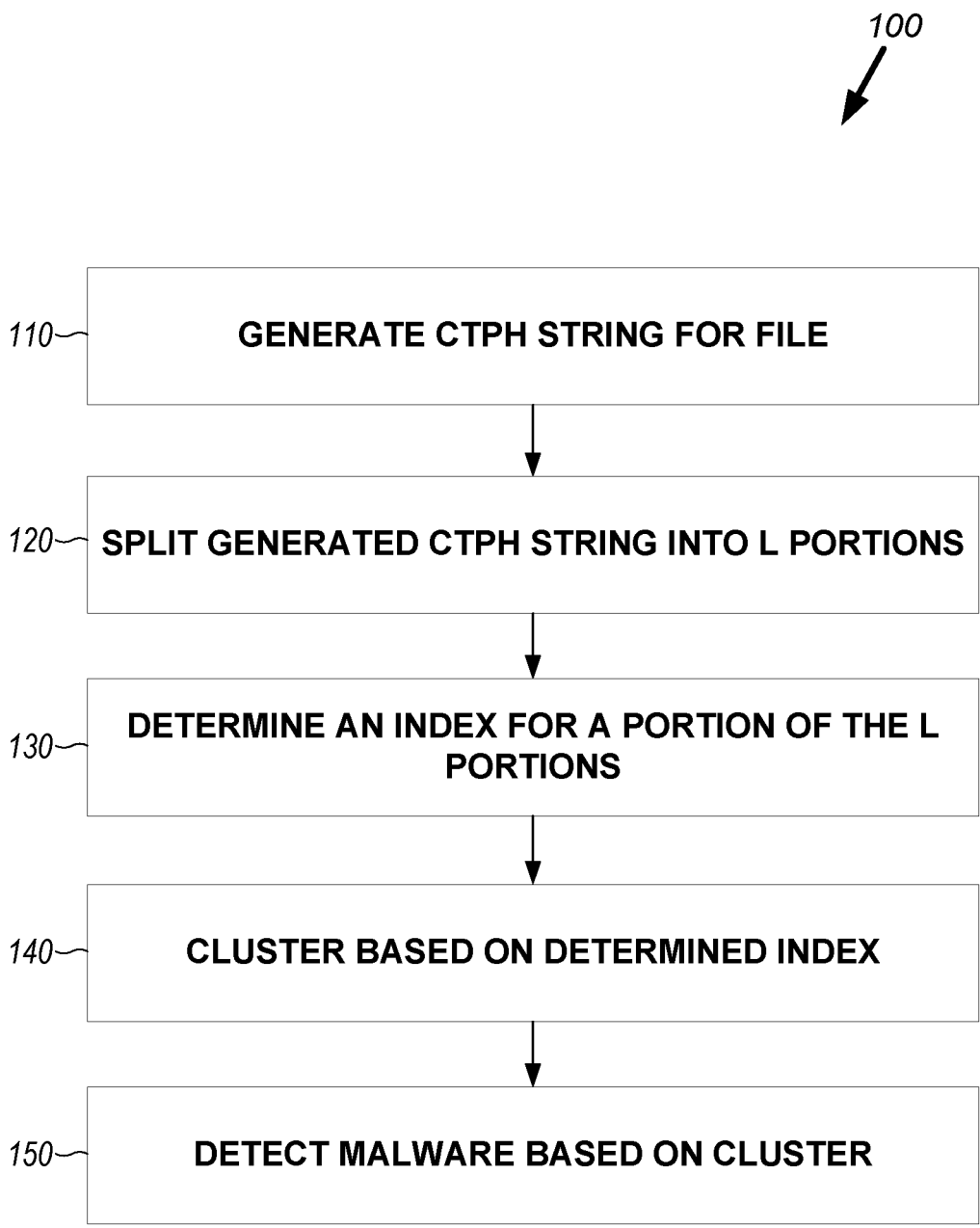
FIG. 1 illustrates, by way of example, a flow diagram of an embodiment of a method for CTPH clustering and detecting malware based on an index of the cluster.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Context Triggered Piecewise Hashing (CTPH) has been used for similarity analysis in information security industry for more than 10 years and has become one of the most popular and standard fuzzy hashing algorithms used. CTPH has been used for sample clustering analysis and malware classification. However, using current CTPH cluster techniques, it is prohibitively expensive to find a group of samples with certain similarity. In order to find similar samples in a reduced time, embodiments provide a simplified CTPH similarity analysis solution to help reduce the cost and still retain cluster accuracy.

Fuzzy hashing allows an investigator to focus on potentially incriminating documents that do not appear using other hashing methods. The use of a fuzzy hash is similar to a fuzzy logic search. A fuzzy hash can look for documents that are similar but not exact equals (sometimes called "homologous" files).

The process of fuzzy hashing is to split a file into blocks, hash each block, and combine all block hashes to a final hash value. CTPH is a fuzzy hashing technique with variable block sizes. It was originally proposed by Jesse Kornblum in 2006. The output of CTPH hashing is a string (a "CTPH string"). CTPH clustering analysis is the task of grouping a set of samples, using CTPH strings, into clusters so that samples in the same cluster are more similar to each other than to samples in other clusters.

As previously discussed in the Background, prior CTPH clustering techniques rely on a similarity metric threshold (a Levenshtein distance threshold) to determine whether to associate a CTPH string with a cluster. The choice of threshold, however, is arbitrary and provides non-deterministic results. This is illustrated in TABLE 1:

TABLE 1

| Example CTPH strings |
| --- |
| 24: hMC5oci9ez + FRbj1NVlPlb8FC3lbmCGi7bCCLLYCy0k04n3 . . . |
| 24: hMC5oci9ez+FRbj INVlPlb8FC3lbmCGi7bCCLLYCy0k04n3 . . . |
| 12: GXwnacE61wW7N8auUa7moijlmuD8Ztl75olbzUOlXBDeZs . . . |
| 12: GXwnacE629W7N8aC96A18iJ lmuD8X + tl75olbzUOlXBDeZs . . . |
| 12: GXwnacE671W7N8aG2oAkiJlmuD8X + tl75olbzUOlXBDeZs . . . |
| 12: GXwnacE6AW7N8aI16238af7wiJlmuD8X + tl75olbzUOlXBD . . . |
| 12: GXwnacE6gW7N8aHfoQOiiJlmuD8X + tl75olbzUOlXBDeZ . . . |
| 12: GXwnacE6MW7N8an0d7oiJlmuD8X + tl75olbzUOlXBDeZs . . . |

Now consider, an example in which the similarity threshold is set to 90%. The strings in the first two rows of TABLE 1 will be associated with a first cluster, while the remaining six CTPH strings will remain unclustered. Next, consider an example in which the similarity threshold is set to 80%. In this example, the strings in the first two rows of TABLE 1 will be associated with a first cluster, the CTPH strings in rows three, five, seven, and will be associated with a second cluster, and the remaining rows will be associated with a third cluster. Finally, consider another example in which the similarity threshold is set to 50%. In this example, the strings in the first two rows of TABLE 1 will be associated with a first cluster and the remaining rows of TABLE 1 will be associated with another cluster.

The non-deterministic result makes the results of such a clustering technique questionable at best and useful by chance. Further, determining the Levenshtein distance between strings is computationally expensive. Consider n as a total number of CTPH strings, p as the average number of CTPH strings per cluster, and m as the number of clusters. The computational complexity using the Levenshtein distance technique is $O((n*m+n)/2)$. Further, the time to cluster using such a technique is not linear and increases exponentially with the total number of CTPH strings. A deterministic clustering technique that saves compute time and compute resources is desired.

FIG. 1 illustrates, by way of example, a flow diagram of an embodiment of a method 100 for CTPH clustering and detecting malware based on an index of a cluster. The method 100 as illustrated includes generating a CTPH string for a file at operation 110. The operation 110 is optional. In some cases, an entity may have access to CTPH strings for at least some of the files for processing using the method 100. In some other cases, the entity may generate respective CTPH strings for one or more of their files to be processed by the method 100. More details regarding the operation 110 are provided in FIG. 2 and the corresponding description thereof.

At operation 120, the CTPH string is split into L portions, where L is a positive integer greater than one (1). The portions can be of same or similar sizes. In some embodiments, each of the L portions includes a minimum number of bytes. The minimum number of bytes can be a positive integer greater than one (1). In some embodiments, the minimum number of bytes can be seventeen (17). More details regarding the operation 120 are provided in FIG. 3 and the corresponding description thereof.

At operation 130, an index can be determined for a portion of the L portions generated at operation 120. The index is an integer value corresponding to a subset of a respective portion of the L portions. For example, the index can correspond to a value represented by a consecutive number of bits of the portion. In some embodiments, the index can be seven consecutive bytes, or more or fewer bytes. More details regarding the operation 130 are provided in FIG. 3 and the corresponding description thereof.

At operation 140, the generated CTPH string can be clustered based on the index determined at operation 130. The determined index of each L portion can be compared to one or more indices of each cluster. In response to determining the index matches any of the indices of the cluster, the CTPH string can be added to that cluster. In response to determining the index does not match an index of the cluster, a new cluster can be generated with the CTPH string. More details regarding the operation 140 are provided in FIG. 4 and the corresponding description thereof.

At operation 150, the cluster(s) to which the CTPH string is mapped at operation 140 can be used to determine whether the file from which the CTPH string was generated includes malware. The operation 150 can include classifying the cluster(s) using an artificial intelligence (AI), machine learning (ML), heuristic, or other technique. Prior knowledge of which files include malware can be used to label each cluster as including malware. The label, in some embodiments, can include an indication of a percentage of the files in the cluster that are known to include malware. A heuristic technique can include indicating the file includes malware in response to determining a cluster to which the file is mapped includes more than a threshold percentage of files known to include malware mapped thereto.

Figure 2:
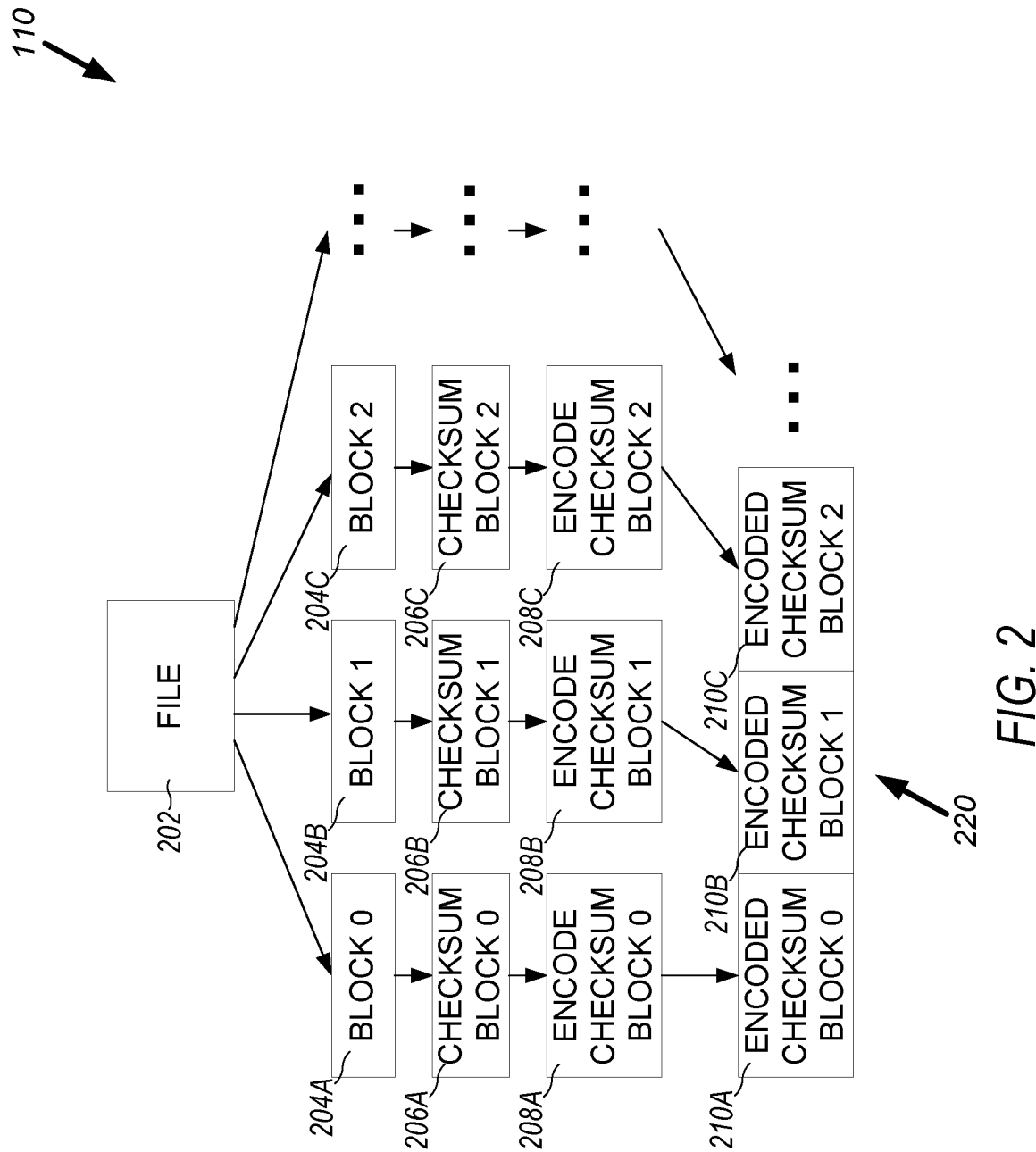
FIG. 2 illustrates, by way of example, a flow diagram of an embodiment of generating a CTPH string based on a computer file.

FIG. 2 illustrates, by way of example, a flow diagram of an embodiment of generating a CTPH string based on a computer file 202. FIG. 2 provides more detail regarding the operation 110, of FIG. 1. There are many different types of computer files. A file can be designed to store a picture, a written message, a video, audio, text, vector graphic, a computer program, or a wide variety of other kinds of data. Some types of files can store several types of information at once. By using computer programs, a user can open, read, change, save, and close a computer file. Computer files may be reopened, modified, and copied. The file 202 can include binary data or data that can be converted to binary form. The file 202, in some embodiments can include block hashes of a raw file. Block hashes can receive input of variable size and produce a string (hash) of fixed length.

The file 202 can be split into blocks 204A, 204B, 204C, etc. Each of the blocks 204A-204C can include a disjoint subset of the file 202 or a portion thereof, such as metadata. The blocks 204A, 204B, 204C can be of a same or different size. The blocks 204A-204C can be sized so that the file 202 is split into Q blocks, where Q is a positive integer greater than one. Thus, each block size can be Z/Q rounded up to the nearest integer, where Z is the size of the file in bytes, bits, or the like.

At operation 206A, 206B, 206C each block 204A-204C can be checksummed, respectively. The operation 206A-206C uses a checksum function to determine a numerical, integer value, for the block 204A-204C, respectively. Checksums are typically used to verify data integrity. Some checksum functions output a significantly different value for small changes made to the input. This is especially true of cryptographic hash functions, which may be used to detect a data corruption error and verify overall data integrity. If the computed checksum for the current data input matches the stored value of a previously computed checksum, there is a very high probability the data has not been accidentally altered or corrupted. Check digits and parity bits are special cases of checksums, appropriate for small blocks of data. Some error-correcting codes are based on special checksums which not only detect common errors but also allow the original data to be recovered in certain cases.

At operation 208A, 208B, 208C, the results of the operations 206A-206C, respectively, can be encoded. An encoding in CTPH typically uses a base 64 character (Base64 char) encoding. Base64 is a group of binary-to-text encoding schemes that represent binary data in an American Standard Code for Information Interchange (ASCII) string format by translating it into a radix-64 representation. Each Base64 digit represents 6 bits of data. Three 8-bit bytes (a total of 24 bits) can therefore be represented by four 6-bit Base64 digits. Base64 is merely an example and other bases, such as Base32, Base128, Base256, or other bases are possible.

To generate a CTPH string 220, all of the encoded checksum blocks 210A, 210B, 210C, from the operations 208A-208C, respectively, can be concatenated to generate a CTPH string 220. The order of the encoded checksum blocks 210A-210C in the CTPH string 220 can be the same relative position as the position of the corresponding block 204A-204C, respectively.

Figure 3:
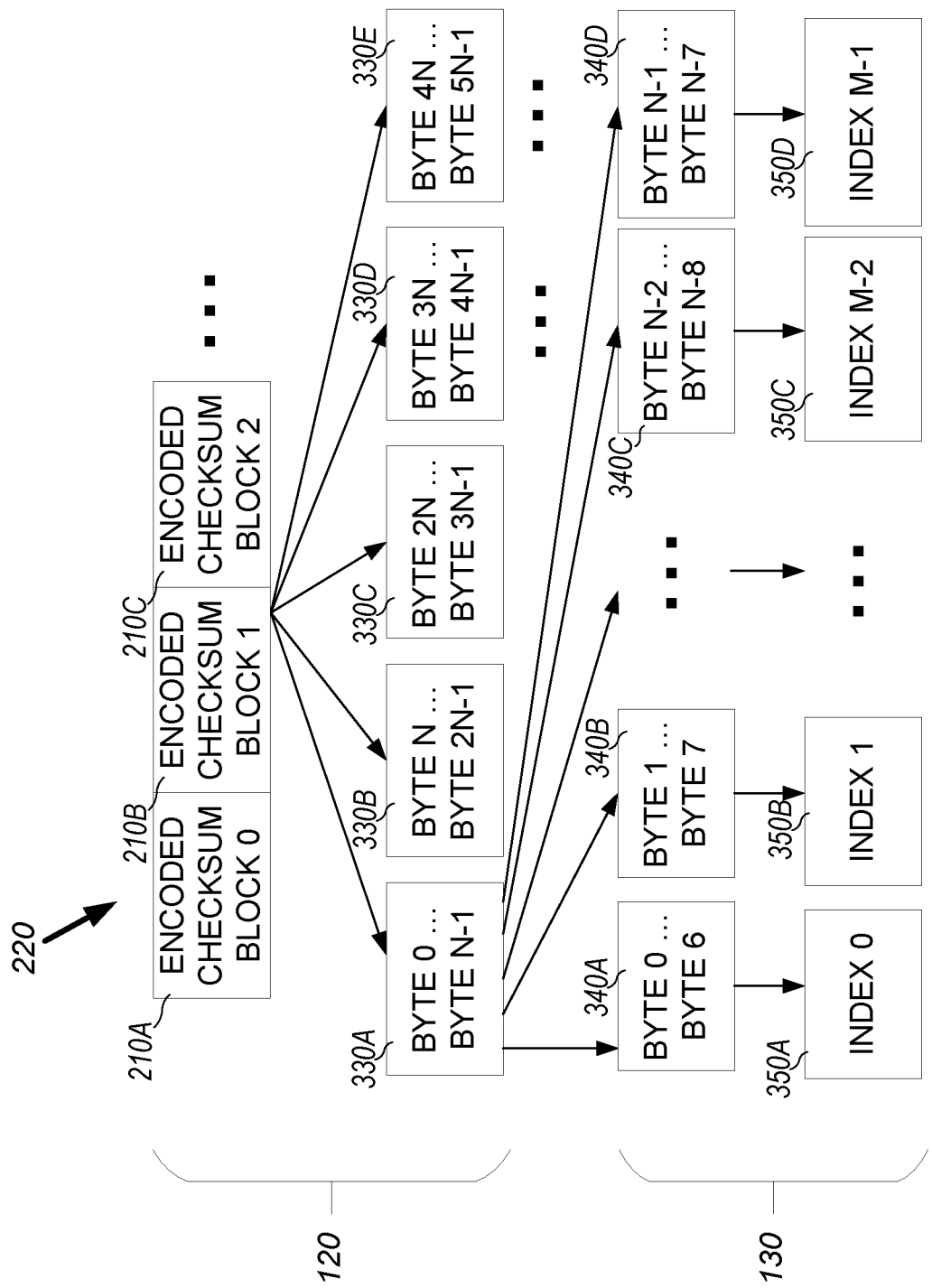
FIG. 3 illustrates, by way of example, a flow diagram of an embodiment of splitting a CTPH string into L portions and determining an index for a portion of the L portions.

FIG. 3 illustrates, by way of example, a flow diagram of an embodiment of splitting a CTPH string into L portions 330A, 330B, 330C, 330D, 330E and determining indices 350A, 350B, 350C, 350D for each of the L portions 330A-330E. The L portions can be byte subsets (e.g., non-overlapping byte subsets, contiguous byte subsets, overlapping byte subsets, or a combination thereof). The indices 350 can be a specified number of (e.g., contiguous) bytes of a given portion of the L portions. FIG. 3 provides more detail regarding operations 120, 130 of FIG. 1.

The CTPH string 220 is split into L portions 330A-330E, of size N bytes in FIG. 3. L and N are both positive integers greater than one (1). In the example of FIG. 3, L is five. N can have a minimum, such as seven bytes, eleven bytes, seventeen bytes, twenty-one bytes, a greater or smaller number of bytes, or a number of bytes therebetween. The minimum of N can affect L, the number of portions into which the CTPH string is divided. For example, with a CTPH string 220 of only fifty (50) bytes and an N of seventeen (17) bytes, L can be three. In some cases, a portion 330A-330E can be padded (with zeros) to make each of the portions 330A-30E the same size.

At operation 130, byte subsets 340A, 340B 340C, 340D (e.g., contiguous byte subsets) of each of the portions 330A-330E can be determined. The number of byte subsets 340A-340D can be determined based on the size of N, the number of bytes in each of the portions 330A-330E. The subset 340A is the most significant bytes (in big endian notation) of the portion 330A and the subset 340D is the least significant bytes of the portion 330A. In the embodiment shown, contiguous subsets 340A, 340B, 340C, 340D of seven (7) bytes are used. The subsets 340A-340D can be contiguous as shown, overlapping, non-overlapping, or a combination thereof. However, subsets of more or fewer bytes can be used. The number of contiguous subsets 340A-340D can be referred to as M, where M is a positive integer greater than zero. In some embodiments, M can be five (5), six (6), seven (7), or more or fewer subsets 340A-340D.

Consider a portion including bytes [1, 35]. Most significant bytes include bytes [1, 7], second most significant bytes include bytes [2, 8], third most significant bytes include bytes [3, 9] and so on. Least significant bytes include bytes [29, 35], second least significant bytes include bytes [28, 34], third most significant bytes include bytes [27, 33] and so on.

Each of the subsets 340A-340D can be used as an index 350A, 350B, 350C, 350D for operation 140. In an example in which the contiguous subsets are seven (7) bytes long, the probability of collision (an index equaling another index) is $1/64^7 \approx 1/4,398$ billion. This is very small such that if a collision occurs, it is likely that the corresponding files associated with the indexes are related or include the same binary sequence. Thus, the indices 350A-350D can be grouped by equality, such as to cluster related files 202. If a hash of a block matches, the output Base64 character also matches. Thus, if a few contiguous block hashes match, a corresponding CTPH substring matches. The probability of finding a block hash match increases with a length of a matched CTPH substring, and the similarity between files increases with the increase of the length of the matched CTPH substring. Thus, CTPH clustering can be useful for finding similar files.

In the example of FIG. 3, the contiguous subsets 340A and 340B are from the beginning of the portion 330A, and the contiguous subsets 340B are from the end of the portion 330A. In some embodiments, the contiguous subsets 340A and 340B from the beginning of the portion 330A can be used to determine the indices 350A and 350B. Then, before the contiguous subsets 340C and 340D from the end of the portion 330A are used to determine the indices 350C and 350D, the indices 350A and 350B can be used in operation 140. In response to no matching cluster 440A, 440B, 440C, 440D, see FIG. 4, being found, then the contiguous subsets 340C and 340D from the end of the portion 330A can used to determine the indices 350C and 350D and compared to the clusters 440A-440D. In some embodiments, the contiguous subsets from the beginning of each of the portions 330A-330E can be used to determine the indices for each of the portions, and all of the determined indices can be used in operation 140 before the contiguous subsets from the end of the portions 330A-330E are used to determine the indices. Then, in response to no matching cluster 440A-440D being found, the contiguous subsets from the end of the portions 330A-330E can used to determine the indices and the indices can be compared to the clusters 440A-440D.

Figure 4:
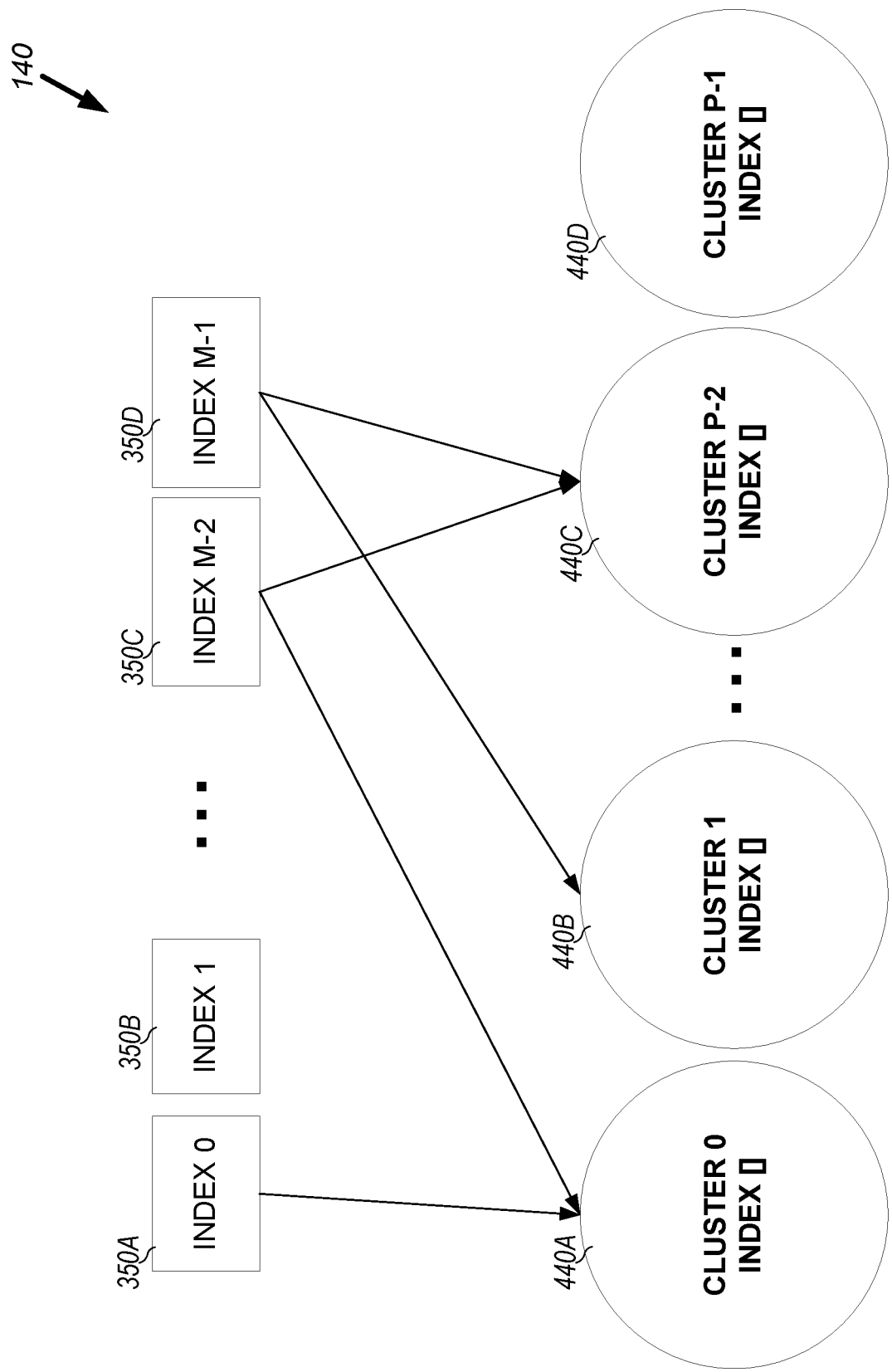
FIG. 4 illustrates, by way of example, a diagram of an embodiment of a clustering operation of a CTPH clustering method.

FIG. 4 illustrates, by way of example, a diagram of an embodiment of a clustering operation. FIG. 4 provides more detail regarding operation 140 of FIG. 1. The operation 140 includes comparing the indices 350A-350D to indices of a cluster 440A, 440B, 440C, 440D. The indices of a cluster 440A-440D can be defined by a first file placed in the cluster 440A-440D, by only the unique indices (indices not currently in any of the other clusters) of the first file placed in the cluster, a single index of the file in the cluster that started the cluster, or all indices of all files placed in the cluster 440A-440D, or the like.

FIG. 4 illustrates P clusters, where P is a positive integer greater than one. However, more or fewer clusters can be used. More discussion regarding a number of clusters used is provided regarding FIGS. 5 and 6. The operation 140 can include comparing each index 350A-350D to at least one of the indices of each cluster 440A-440D. In the example of FIG. 4, each cluster has L*M indices, as there are M indices and L portions for each file. However, as previously discussed, more or fewer indices can be associated with each cluster 440A-440D. In response to determining the index appears in the cluster 440A-440D, the file 202 can be associated with that cluster 440A-440D. In response to determining the file 202 includes indices 350A-350D in common with multiple clusters 440A-440D, the file 202 can be associated with each of the multiple clusters 440A-440D. In the example of FIG. 4, the indices 350A, 350C, and 350D are mapped to clusters 440A, 440B, 440C, while the index 350B is not mapped to any cluster.

In some embodiments, the indices 350A-350D not currently in the cluster 440A-440D can be added to the cluster 440A-44D for future cluster testing. In some other embodiments, the indices 350A-350D not currently in the cluster 440A-440D are not included in future cluster testing. In some embodiments, in response to determining an index, such as the index 350B, does not map to a cluster 440A-440D, the index 350B can form the basis for a new cluster 440A-440D.

In response to determining no indices 350A-350D of the CTPH string 220 match any of the clusters 440A-440D, the CTPH string 220 can used as a basis for a new cluster (if more clusters are allowed). In some embodiments, a comparison between indices 350C and 350D and the indices 350A and 350B can be performed to help identify binary repetition in the file 202.

A computational complexity of the clustering operation 140 is simply O(n), providing a significant improvement over the prior Levenshtein distance clustering technique. Further, whether to cluster CTPH string in embodiments is deterministic (in response to determining an index of the CTPH string matches an index of a cluster, then the CTPH string (or file) is associated with the cluster). Further, the CTPH string clustering of embodiments can detect similarities in files that block hash clustering techniques (e.g., SHA256 hash) cannot detect.

Consider the following SHA256 representations of files:
1: 8bfb9c2c9d11c7080a72db22d8fe43c5c9508899da1f16ac55b0e9af276ab60c
2: 09bdb7514e4cce9760f23c6302623895def5d78e7265e105d5526ce1f0d75f3f
3: 49808e3beb9124702e22b333e3a11c6bde95bce659bf003d15fb733019373b6e
4: 82c3e16c825ce84981696b8615ee71b16c701c77ae63b825769ef25120c77585
5: abb011d36eccd9493fb37724bdd939496de5a2ac7593ab01346fb2b9b2d3d7cc
6: 24d16f95b80f247b6aa390da0d027343bcd24e7b119aa82847b1e67bbad85a0c
7: 1e75ff5e4d62db3b2e41ac5f0336b0c1dccae3c141645bdce7bcb79785dacca8

These SHA256 representations can have CTPH string representations as follows:
1: e7OEqtoBMbJsv6tWKFdu9C5OL34qtEUhmkkYVE
2: e7OEqtoBMbJsv6tWKFdu9C5OL3aQPxZoJqkJ5
3: e7OEqtoBMbJsv6tWKFdu9C5OL3EqGy5UDM
4: e7OEqtoBMbJsv6tWKFdu9C5OL3fZZnpzjYj6

5: e7OEqtoBMbJsv6tWKFdu9C5OL3jQPxZoJqkJ5
6: e7OEqtoBMbJsv6tWKFdu9C5OL3UQPxZoJqkJ5
7: e7OEqtoBMbJsv6tWKFdu9C5OL3Yc+ZiHh For each CTPH string, the length (e.g., number of bits or bytes) of the string can be determined. The length of the indexes can be pre-determined or can be determined based on the number of indexes to be compared. An offset at which to determine a next CTPH string can be determined. The offset can be greater than, equal to, or less than the length of the CTPH string. Assume, for this example, that the length of the index is 7 bytes. The number of indexes (rounding down) for the CTPH string of the first file "1" can be 5 as follows:

Index1: e7OEqto,
Index2: BMbJsv6,
Index3: tWKFdu9,
Index4: C5OL34q,
Index5: tEUhmkk The same process can be used to determine indexes for each CTPH string. For the CTPH string of file 7, the offset can be six and the length of the index can be 7. The indexes for this configuration can be:

Index 1: e7OEqto,
Index 2: oBMbJsv,
Index 3: v6tWKFd,
Index 4: du9C5OL,
Index 5: L3Yc+Zi After the indexes are determined at this initial position, strings that include equal Index 1s can be clustered and Index 1 can be the representative index of the cluster, strings that include equal Index 2s can be clustered and Index 2 can be the representative index of the cluster, and so on through to the last index.

From the clustering in this initial position, all of the files 1-7 can be clustered together. This is likely not to be the case in the distance calculation using the Levenshtein distance calculation. Files 1 and 7 for example, have a similarity (distance) of 77%, which is unlikely to be clustered as most techniques require greater than 80% similarity.

For files that are not clustered in the first round of clustering, a next round of clustering can be performed. Consider the following CTPH string:
8: Pf7OEqtoBMbJsv6tWKFdu9C5OL34qtEUhmkkYVE
9: xf7OEqtoBMbJsv6tWKFdu9C5OL3Yc+ZiHh The first round of clustering will not cluster these files together, even though the files are quite similar (the second through 27$^{th}$ bytes of the CTPH string are equal). In the second round of clustering (or another subsequent round of clustering) the first byte of the CTPH strings can be removed. Indexes for the resulting, shorter CTPH strings can be determined, compared, and clustered (as discussed with the first round).

If a file is still not clustered after the second round of clustering (or another subsequent round of clustering), indexes from the second round (or another subsequent round) can be compared to the indexes from one or more of the previous rounds. Consider the following CTPH strings:
10: e7OEqtoBMbJsv6tWKFdu9C5OL34qtEUhmkkYVE
11: xe7OEqtoBMbJsv6tWKFdu9C5OL3Yc+ZiHh These two files, 10 and 11, include CTPH strings that include 26 same bytes, but would not cluster based on the previous rounds described. In the described third round, these two files can be clustered. Note that, in the third round, or a subsequent round, the Index 1 from round 1 can be compared to Index 1 from round 2, Index 2 from round 1 can be compared to Index 2 from round 2, and so on.

More rounds of removing bits, such that two or more bits are removed from the beginning of the CTPH string, indexes determined, and then compared to indexes of the same round or a different round, and clustered accordingly. Note that this clustering so far has included comparing based on most significant bytes. The same process can be performed for least significant bytes.

For the files 1-7, the Index 5 determined as the least significant bytes can be as follows:
File 1: hmkkYVE
File 2: ZoJqkJ5
File 3: qGy5UDM
File 4: npzjYj6
File 5: ZoJqkJ5
File 6: ZoJqkJ5
File 7: Yc+ZiHh These indexes can then be compared and clustered if any are equal. Then, if a file is still unclustered, the least significant byte can be removed and the clustering performed again (least significant byte aligned). Similar to the most significant byte alignment rounds, indexes from the least significant byte removal rounds can be compared to indexes from the same round or a previous round and clustered if indexes are equal.

In general, comparing the distance edit computational complexity (exponential function), to the index comparison technique of embodiments (a liner function), which reduce the CPU cost a lot. How many rounds could be optimized, the basic solution is to split the string and comparing the substring on all the samples instead of doing distance calculation on each pair.

Figure 5:
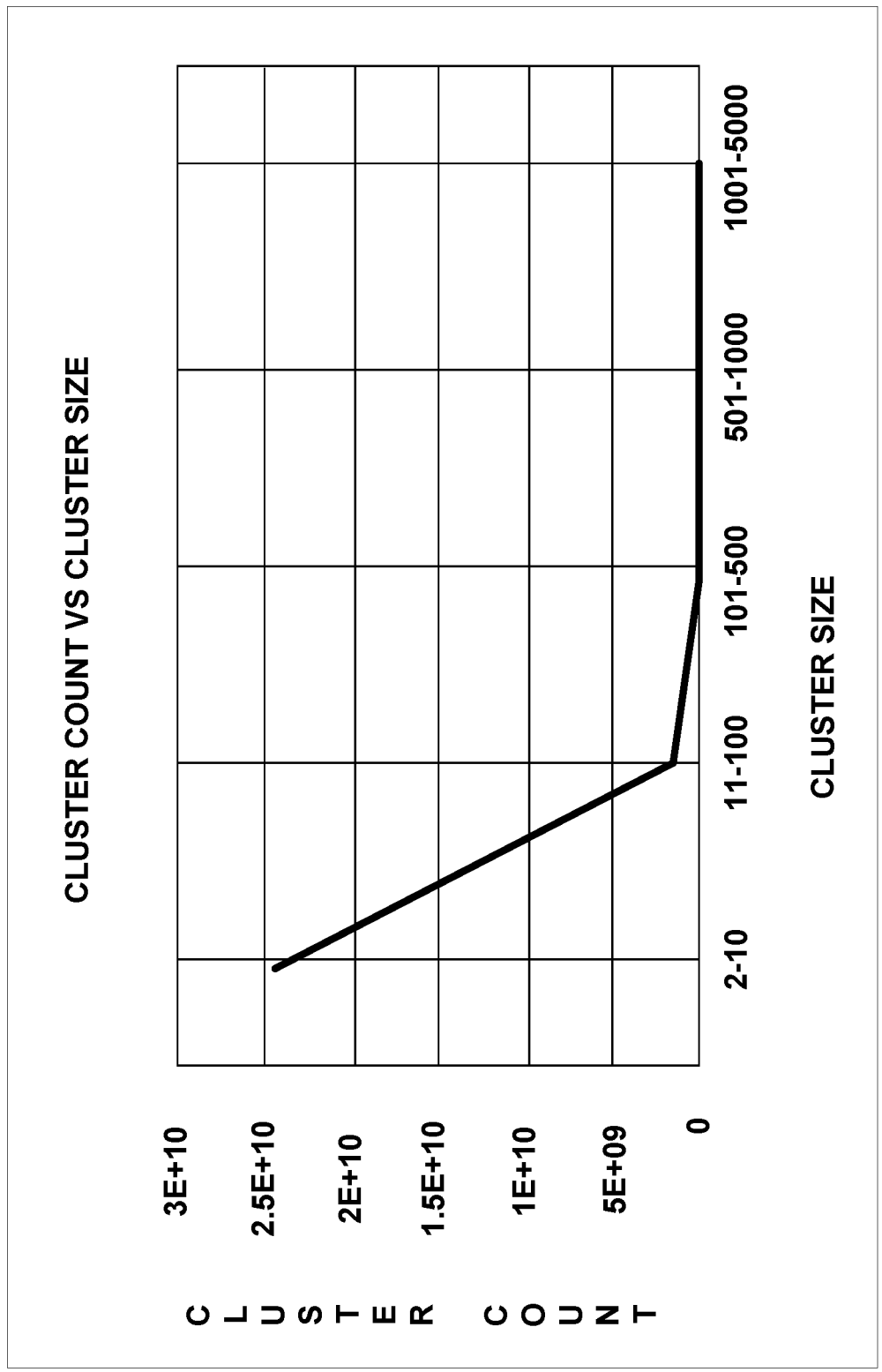
FIG. 5 illustrates, by way of example, a graph of cluster count vs. cluster size for a secure hash algorithm 256 bit (SHA256).

FIG. 5 illustrates, by way of example, a graph of cluster count vs. cluster size for a secure hash algorithm 256 bit (SHA256). As can be seen, as the cluster count increases, the cluster size (in terms of the number of CTPH strings 220 (or associated files 202)) decreases.

Figure 6:
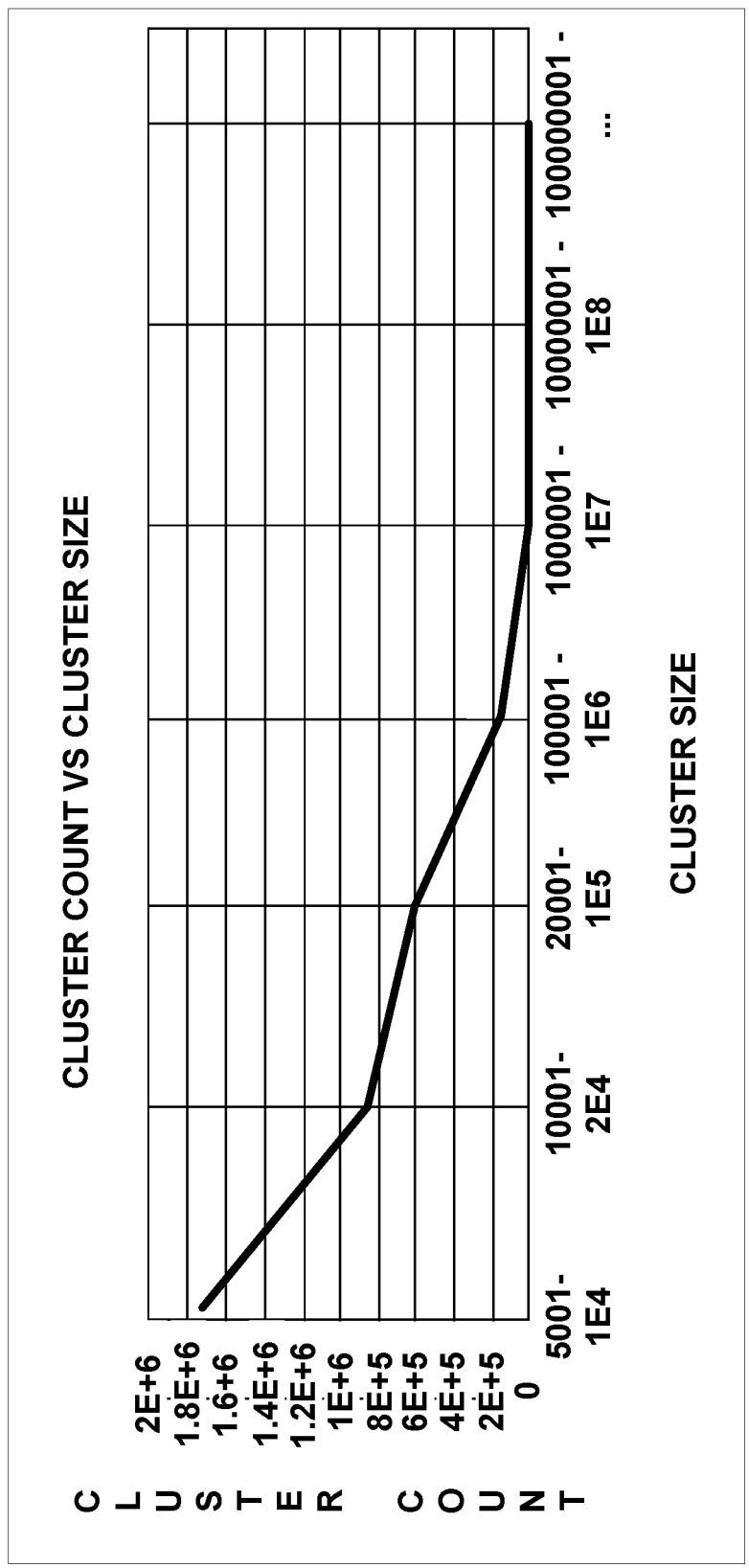
FIG. 6 illustrates, by way of example, a graph of cluster count vs. cluster size for a CTPH clustering method of embodiments.

FIG. 6 illustrates, by way of example, a graph of cluster count vs. cluster size for the method 100. As can be seen, as the cluster count increases, the cluster size decreases. However, compared to the SHA256 cluster technique, the method 100 results in a more gradual increase in cluster size. While not illustrated, the percentage of unclustered data in both techniques corresponding to the graphs of FIGS. 5 and 6 remains about the same (about 14%).

Figure 7:
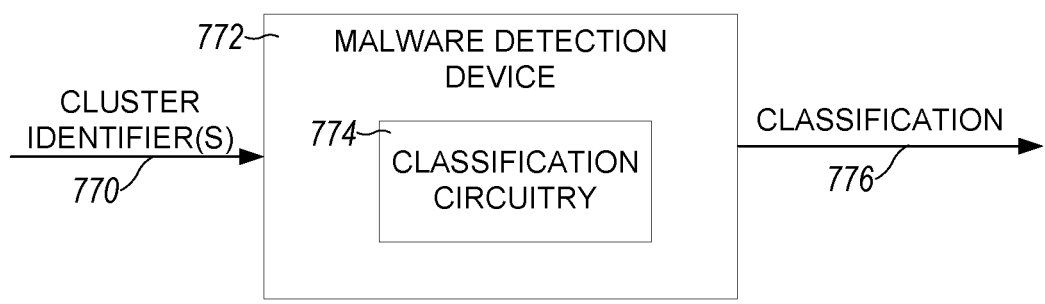
FIG. 7 illustrates, by way of example, a diagram of an embodiment of a malware detection device.

FIG. 7 illustrates, by way of example, a diagram of an embodiment of a malware detection device 772. The malware detection device 772 can receive cluster identifier(s) 770 as input and generate, using classification circuitry 774, a classification 776 indicating whether (a likelihood whether) the file 202 corresponding to the cluster identifier (s) 770 corresponds to malware. The cluster identifier(s) 770 indicate the cluster(s) 440A-440D to which the CTPH string 220 of the file 202 is mapped (e.g., at operation 140). The cluster identifier(s) 770 can be associated with an indication as to whether the cluster is known to include files that include malware. In some embodiments, a percentage of the files of the cluster 440A-440D known to include malware can be included with the cluster identifier 770.

The classification circuitry 774 includes one or more electric or electronic components configured to determine the classification 776 based on the cluster identifier(s) 770. The classification circuitry 774 can implement a heuristic based technique or be trained to implement an ML or AI based technique of determining the classification. The heuristic based technique defines rules that provide the classification 776 based on the cluster identifier(s) 770. For example, in response to determining some mathematical combination of the percentage of files determined to include malware in clusters corresponding to the cluster identifier(s) 770 is greater than, or equal to, a threshold, then the classification 776 can indicate the file includes malware or otherwise deserves further consideration. The threshold can be twenty-five (25) percent, thirty (30) percent, fifty (50) percent, seventy-five (75) percent, some greater or lower percentage, or some percentage therebetween.

An ML or AI based technique of determining the classification 776 can include using cluster identifier(s) 770 and corresponding labels (malware, percentage of files including malware, not malware, or the like) can be used to train the classification circuitry 774 to determine the classification 776. The classification circuitry 774 can then take a new set of cluster identifier(s) 770 and determine the classification 776 based on the training.

The electric or electronic components of the classification circuitry 774 or other circuitry can include one or more transistors, resistors, capacitors, inductors, amplifiers, modulators, demodulators, antennas, radios, regulators, diodes, oscillators, multiplexers, logic gates (e.g., AND, OR, XOR, negate, or the like), buffers, caches, memories, GPUs, CPUs, FPGAs, ASICs, or the like.

Figure 8:
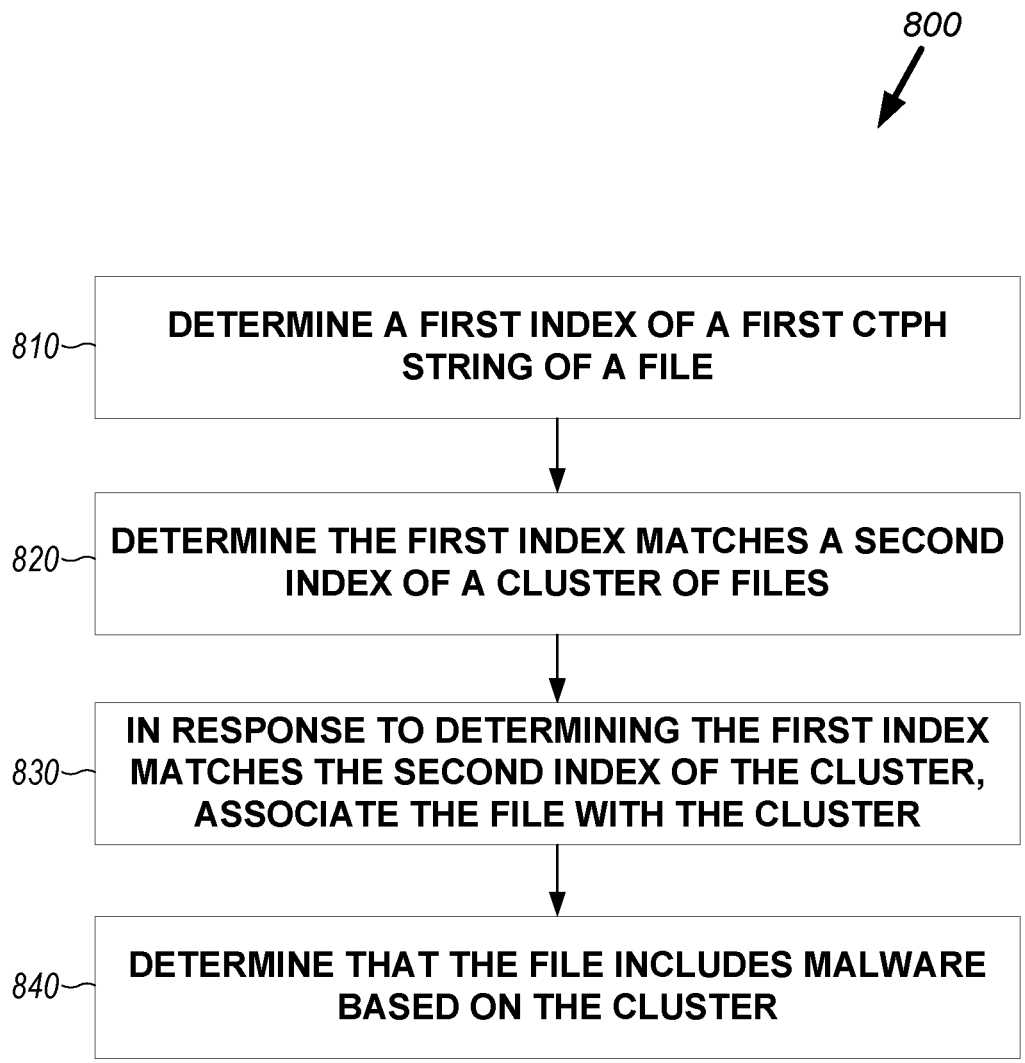
FIG. 8 illustrates, by way of example, a diagram of an embodiment of a method for malware detection using a CTPH string.

FIG. 8 illustrates, by way of example, a flow diagram of a method 800 for identifying a malicious file using indexes of a CTPH string of the file. The method 800 as illustrated includes determining (e.g., by processing circuitry of a computing device (e.g., a processing unit 902 of the device 900)), a first index (e.g., index 350A) of a first CTPH string 220 of a file 202, at operation 810; determining the first index matches a second index of a cluster (e.g., cluster 440A-440D) of files, at operation 820; in response to determining the first index matches the second index of the cluster, associating the file with the cluster, at operation 830; and determining that the file includes malware based on the cluster (e.g., using classification circuitry 774 of a malware detection device 772 that is same or different from the device including the processing circuitry), at operation 840. The first index can include contiguous bits of the CTPH string. The first index can be smaller than the CTPH string, such as to be a proper subset of the CTPH string. A proper subset of a set A is a subset of A that is not equal to A. In other words, if B is a proper subset of A, then all elements of B are in A but A contains at least one element that is not in B.

The operation 810 can include splitting the first CTPH string into disjoint portions (e.g., portions 330A-330E) of contiguous, non-overlapping bits. The first index can be determined as a first number of contiguous, non-overlapping bits of a portion of the portions of the first CTPH string. The cluster can be one cluster of respective clusters of files.

The first index can include the most significant bytes of the CTPH string. The method 800 can further include determining a third index of the CTPH string that corresponds to least significant bytes of the CTPH string matches the second index. The method 800 can further include in response to determining the third index of the CTPH string matches the second index, associating the file with the cluster of the clusters. The third index can be determined in response to the first index not matching any of the respective second indexes.

The first index can include the most significant bytes of the portion. The first index can be determined for each portion of the portions. The method 800 can further include determining, for each portion of the portions, a fourth index that includes the second most significant bytes of the portion. The method 800 can further include determining, for each portion of the portions, a fifth index that includes the third most significant bytes of the portion. The method 800 can further include in response to determining one of the first index, fourth index, and fifth index of a portion of the portions matches the second index, associating the file with the cluster.

The third index can include the least significant bytes of the portion. The third index can be determined for each portion of the portions. The method 800 can further include determining, for each portion of the portions, a sixth index that includes the second least significant bytes of the portion. The method 800 can further include, in response to determining one of the third index or sixth index matches the second index, associating the file with the cluster.

Figure 9:
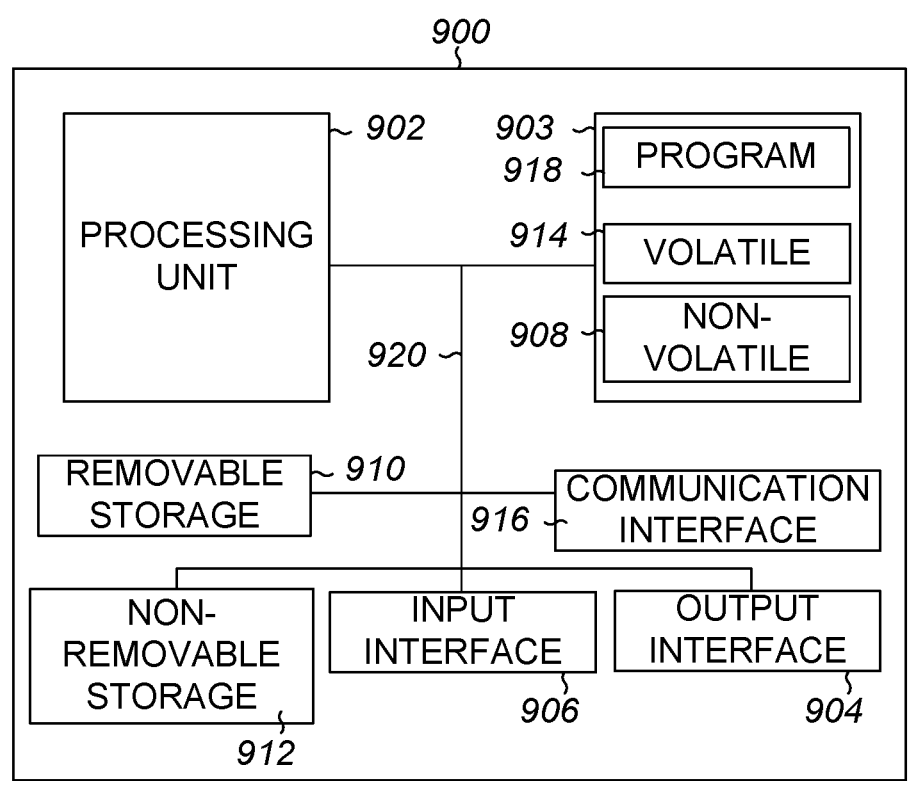
FIG. 9 illustrates, by way of example, a block diagram of an embodiment of a machine (e.g., a computer system) to implement one or more embodiments.

FIG. 9 illustrates, by way of example, a block diagram of an embodiment of a machine 900 (e.g., a computer system) to implement one or more embodiments. The machine 900 can implement a technique for CTPH string clustering or malware detection, such as the method 100 or 800. The malware detection device 772 or the classification circuitry 774 can include one or more of the components of the machine 900. One example machine 900 (in the form of a computer), may include a processing unit 902, memory 903, removable storage 910, and non-removable storage 912. Although the example computing device is illustrated and described as machine 900, the computing device may be in different forms in different embodiments. For example, the computing device may instead be a smartphone, a tablet, smartwatch, or other computing device including the same or similar elements as illustrated and described regarding FIG. 9. Devices such as smartphones, tablets, and smartwatches are generally collectively referred to as mobile devices. Further, although the various data storage elements are illustrated as part of the machine 900, the storage may also or alternatively include cloud-based storage accessible via a network, such as the Internet.

Memory 903 may include volatile memory 914 and non-volatile memory 908. The machine 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 900 may include or have access to a computing environment that includes input 906, output 904, and a communication connection 916. Output 904 may include a display device, such as a touchscreen, that also may serve as an input device. The input 906 may include one or more of a touchscreen, touchpad, mouse, keyboard, camera, one or more device-specific buttons, one or more sensors integrated within or coupled via wired or wireless data connections to the machine 900, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 902 (sometimes called processing circuitry) of the machine 900. A hard drive, CD-ROM, and RAM are some examples of articles including a non-transitory computer-readable medium such as a storage device. For example, a computer program 918 may be used to cause processing unit 902 to perform one or more methods or algorithms described herein.

ADDITIONAL NOTES AND EXAMPLES

Example 1 can include a system comprising processing circuitry and a memory including instructions stored thereon that, when executed by the processing circuitry, cause the processing circuitry to perform operations for determining a file includes malware, the operations including determining a first index of a first context triggered piecewise hashing (CTPH) string of the file, the first index including contiguous bits of the CTPH string, the first index smaller than the CTPH string, determining the first index matches a second index of a cluster of files, in response to determining the first index matches the second index of the cluster, associating the file with the cluster, and determining that the file includes malware based on the cluster.

In Example 2, Example 1 can further include, wherein determining the first index of the first CTPH string includes splitting the first CTPH string into disjoint portions of contiguous, non-overlapping bits.

In Example 3, Example 2 can further include, wherein the first index is determined as a first number of contiguous bits of a portion of the portions of the first CTPH string.

In Example 4, Example 3 can further include, wherein the cluster is one cluster of respective clusters of files.

In Example 5, Example 4 can further include, wherein the first index includes the most significant bytes of the CTPH string and the operations further include determining a third index of the CTPH string that corresponds to least significant bytes of the CTPH string matches the second index, and in response to determining the third index of the CTPH string matches the second index, associating the file with the cluster of the clusters.

In Example 6, Example 5 can further include, wherein the third index is determined in response to the first index not matching any of the respective second indexes.

In Example 7, at least one of Examples 4-6 can further include, wherein the first index includes the most significant bytes of the portion and is determined for each portion of the portions and the operations further include determining, for each portion of the portions, a fourth index that includes the second most significant bytes of the portion, determining, for each portion of the portions, a fifth index that includes the third most significant bytes of the portion, and in response to determining one of the first index, fourth index, and fifth index of a portion of the portions matches the second index, associating the file with the cluster.

In Example 8, at least one of Examples 6-7 can further include, wherein the third index includes the least significant bytes of the portion and is determined for each portion of the portions and the operations further include determining, for each portion of the portions, a sixth index that includes the second least significant bytes of the portion, and in response to determining one of the third index or sixth index matches the second index, associating the file with the cluster.

Example 9 includes a method for determining a file includes malware using clustering based on context triggered piecewise hashing (CTPH), the method comprising determining, by processing circuitry of a computing device, a first index of a first CTPH string of the file, the first index including contiguous bits of the CTPH string, the first index smaller than the CTPH string, determining the first index matches a second index of a cluster of files, in response to determining the first index matches the second index of the cluster, associating the file with the cluster, and determining that the file includes malware based on the cluster.

In Example 10, Example 9 can further include, wherein determining the first index of the first CTPH string includes splitting the first CTPH string into disjoint portions of contiguous, non-overlapping bits.

In Example 11, Example 10 can further include, wherein the first index is determined as a first number of contiguous bits of a portion of the portions of the first CTPH string.

In Example 12, at least one of Examples 9-11 can further include, wherein the cluster is one cluster of respective clusters of files.

In Example 13, at least one of Examples 9-12 can further include, wherein the first index includes the most significant bytes of the CTPH string and the method further includes determining a third index of the CTPH string that corresponds to least significant bytes of the CTPH string matches the second index, and in response to determining the third index of the CTPH string matches the second index, associating the file with the cluster of the clusters.

In Example 14, Example 13 can further include, wherein the third index is determined in response to the first index not matching any of the respective second indexes.

In Example 15, at least one of Examples 12-14 can further include, wherein the first index includes the most significant bytes of the portion and is determined for each portion of the portions and the method further comprises determining, for each portion of the portions, a fourth index that includes the second most significant bytes of the portion, determining, for each portion of the portions, a fifth index that includes the third most significant bytes of the portion, and in response to determining one of the first index, fourth index, and fifth index of a portion of the portions matches the second index, associating the file with the cluster.

In Example 16, at least one of Examples 13-15 can further include, wherein the third index includes the least significant bytes of the portion and is determined for each portion of the portions and the method further comprises determining, for each portion of the portions, a sixth index that includes the second least significant bytes of the portion, and in response to determining one of the third index or sixth index matches the second index, associating the file with the cluster.

Example 17 includes a non-transitory machine-readable medium including instructions that, when executed by a machine, cause the machine to perform operations for determining a file includes malware using context triggered piecewise hashing (CTPH), the operations comprising determining, by processing circuitry of a computing device, a first index of a first CTPH string of the file, the first index including contiguous bits of the CTPH string, the first index smaller than the CTPH string, determining the first index matches a second index of a cluster of files, in response to determining the first index matches the second index of the cluster, associating the file with the cluster, and determining that the file includes malware based on the cluster.

In Example 18, Example 17 can further include, wherein determining the first index of the first CTPH string includes splitting the first CTPH string into disjoint portions of contiguous, non-overlapping bits.

In Example 19, at least one of Examples 17-18 can further include, wherein the first index is determined as a first number of contiguous bits of a portion of the portions of the first CTPH string.

In Example 20, at least one of Examples 17-19 can further include, wherein the cluster is one cluster of respective clusters of files.

In Example 21, Example 20 can further include, wherein the first index includes the most significant bytes of the CTPH string and the operations further include determining a third index of the CTPH string that corresponds to least significant bytes of the CTPH string matches the second index, and in response to determining the third index of the CTPH string matches the second index, associating the file with the cluster of the clusters.

In Example 22, Example 21 can further include, wherein the third index is determined in response to the first index not matching any of the respective second indexes.

In Example 23, at least one of Examples 21-22 can further include, wherein the first index includes the most significant bytes of the portion and is determined for each portion of the portions and the operations further comprise determining, for each portion of the portions, a fourth index that includes the second most significant bytes of the portion, determining, for each portion of the portions, a fifth index that includes the third most significant bytes of the portion, and in response to determining one of the first index, fourth index, and fifth index of a portion of the portions matches the second index, associating the file with the cluster.

In Example 24, at least one of Examples 21-23 can further include, wherein the third index includes the least significant bytes of the portion and is determined for each portion of the portions and the operations further comprise determining, for each portion of the portions, a sixth index that includes the second least significant bytes of the portion, and in response to determining one of the third index or sixth index matches the second index, associating the file with the cluster.

Some embodiments can be further understood with reference to computer software code configured to implement a portion of a method discussed (e.g., the method 100, 800, or a combination thereof). Such computer software code is provided here for convenient reference:

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
   processing circuitry; and
   a memory including instructions stored thereon that, when executed by the processing circuitry, cause the processing circuitry to perform operations for determining a file type of a file, the operations including:
   splitting a first context triggered piecewise hashing (CTPH) string of the file into disjoint portions of contiguous bits;
   determining a first index of a first CTPH string of the file, the first index is a first number of contiguous bits of a portion of the portions of the CTPH string;
   determining the first index matches a second index of a cluster of files;
   in response to determining the first index matches the second index of the cluster, associating the file with the cluster; and
   determining the file type based on the cluster.

2. The system of claim 1, wherein the cluster is one cluster of respective clusters of files.

3. The system of claim 2, wherein the first index includes the most significant bytes of the CTPH string and the operations further include:
   determining a third index of the CTPH string that corresponds to least significant bytes of the CTPH string matches the second index; and
   in response to determining the third index of the CTPH string matches the second index, associating the file with the cluster of the clusters.

4. The system of claim 3, wherein the third index is determined in response to the first index not matching the second index.

5. The system of claim 2, further comprising:
   determining, for each portion of the portions, a fourth index that includes the second most significant bytes of the portion; and
   in response to determining the fourth index matches the second index, associating the file with the cluster.

6. The system of claim 4, wherein the operations further include:
   determining, for each portion of the portions, a sixth index that includes the second least significant bytes of the portion; and
   in response to determining the sixth index matches the second index, associating the file with the cluster.

7. A processing circuitry-implemented method for determining a file type of a file, the method comprising:
   splitting a first context triggered piecewise hashing (CTPH) string of the file into disjoint portions of contiguous bits;
   determining a first index of a first CTPH string of the file, the first index is a first number of contiguous bits of a portion of the portions of the CTPH string;
   determining the first index matches a second index of a cluster of files;
   in response to determining the first index matches the second index of the cluster, associating the file with the cluster; and
   determining the file type based on the cluster.

8. The method of claim 7, wherein the cluster is one cluster of respective clusters of files.

9. The method of claim 8, wherein the first index includes the most significant bytes of the CTPH string and the method further includes:
   determining a third index of the CTPH string that corresponds to least significant bytes of the CTPH string matches the second index; and
   in response to determining the third index of the CTPH string matches the second index, associating the file with the cluster of the clusters.

10. The method of claim 9, wherein the third index is determined in response to the first index not matching the second index.

11. The method of claim 9, wherein the first index includes the most significant bytes of the portion and the method further comprises:
    determining a fourth index that includes the second most significant bytes of the portion; and in response to determining the fourth index matches the second index, associating the file with the cluster.

12. The method of claim 11, wherein the third index includes the least significant bytes of the portion and the method further comprises:
    determining a sixth index that includes the second least significant bytes of the portion; and
    in response to determining the sixth index matches the second index, associating the file with the cluster.

13. A non-transitory machine-readable medium including instructions that, when executed by a machine, cause the machine to perform operations for determining a file type of a file, the operations comprising:
    splitting a first context triggered piecewise hashing (CTPH) string of the file into disjoint portions of contiguous bits;
    determining a first index of a first CTPH string of the file, the first index is a first number of contiguous bits of a portion of the portions of the CTPH string;
    determining the first index matches a second index of a cluster of files;
    in response to determining the first index matches the second index of the cluster, associating the file with the cluster; and
    determining the file type based on the cluster.

14. The non-transitory machine-readable medium of claim 13, wherein the cluster is one cluster of respective clusters of files.

15. The non-transitory machine-readable medium of claim 14, wherein the first index includes the most significant bytes of the CTPH string and the operations further include:
    determining a third index of the CTPH string that corresponds to least significant bytes of the CTPH string matches the second index; and
    in response to determining the third index of the CTPH string matches the second index, associating the file with the cluster of the clusters.

16. The non-transitory machine-readable medium of claim 15, wherein the third index is determined in response to the first index not matching the second index.

17. The non-transitory machine-readable medium of claim 16, wherein the first index includes the most significant bytes of the portion and the operations further comprise:
    determining a fourth index that includes the second most significant bytes of the portion; and
    in response to determining the fourth index matches the second index, associating the file with the cluster.

18. The non-transitory machine-readable medium of claim 17, wherein the third index includes the least significant bytes of the portion and the operations further comprise:
    determining a sixth index that includes the second least significant bytes of the portion; and
    in response to determining one of the third index or sixth index matches the second index, associating the file with the cluster.

* * * * *